(12) United States Patent
Lim et al.

(10) Patent No.: US 6,209,017 B1
(45) Date of Patent: Mar. 27, 2001

(54) HIGH SPEED DIGITAL SIGNAL PROCESSOR

(75) Inventors: Il Taek Lim; Jun Ho Bahn, both of Seoul; Kyu Seok Kim, Kyungki-do, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/143,351

(22) Filed: Aug. 28, 1998

(30) Foreign Application Priority Data

Aug. 30, 1997 (KR) ................................................. 97-45341
Aug. 30, 1997 (KR) ................................................. 97-45342
Aug. 30, 1997 (KR) ................................................. 97-45343
Aug. 30, 1997 (KR) ................................................. 97-45345
Apr. 7, 1998 (KR) ................................................. 98-12318

(51) Int. Cl.[7] ........................................................ G06F 7/38
(52) U.S. Cl. ................................................ 708/552; 708/551
(58) Field of Search .................................... 708/552, 551, 708/497, 498, 209, 208

(56) References Cited

U.S. PATENT DOCUMENTS

| | | | |
|---|---|---|---|
| 4,760,544 | 7/1988 | Lamb | .................................. 364/736 |
| 4,945,507 | * 7/1990 | Ishida et al. | .......................... 708/551 |
| 5,265,259 | * 11/1993 | Satou et al. | ........................... 708/209 |
| 5,532,949 | * 7/1996 | Fujihara | ............................... 708/209 |
| 5,936,870 | * 8/1999 | Im | ....................................... 708/552 |
| 5,974,540 | * 10/1999 | Morikawa et al. | .................. 708/552 |

FOREIGN PATENT DOCUMENTS

| | | |
|---|---|---|
| 0 345 819 A2 | 12/1989 | (EP) . |
| 0 534 760 A2 | 3/1993 | (EP) . |
| 0 657 804 A1 | 6/1995 | (EP) . |
| 0 780 759 A1 | 6/1997 | (EP) . |
| 2178575 | 2/1987 | (GB) . |
| 95-25529 | 7/2000 | (KR) . |

* cited by examiner

*Primary Examiner*—David H. Malzahn
(74) *Attorney, Agent, or Firm*—Fleshner & Kim, LLP

(57) ABSTRACT

A digital signal processor having an ALU and accumulating register small in bit number. The digital signal processor adds r-bit rounding bits to an N-bit data(wherein r<N) and adds g-bit guard bits to the high-order bits of the data using bit alignment units each being implemented with a wiring, when N bit data is processed. The data added by the guard bits and the rounding bits is operated by means of the accumulator. The operated data is selectively rounded by a rounding processor. Also, the selectively rounded data is selectively saturated by a saturation processor.

24 Claims, 8 Drawing Sheets

HIGH SPEED DIGITAL SIGNAL PROCESSOR

BACKGROUND OF THE INVENTION

1. Field of the Invention

This invention relates to a digital signal processor(DSP) for processing various digital signals depending upon any programs.

2. Description of the Prior Art

Conventionally, the DSP can employ any one of a floating-point arithmetic and a fixed-point arithmetic. The floating-point arithmetic has a disadvantage in that it provides more accurate result than, but costs considerably more than the fixed-point arithmetic. Accordingly, most DSPs employ the fixed-point arithmetic. In order to prevent the error generation, the DSP of fixed-point arithmetic system having a typical N bit wordlength makes use of an arithmetic logic unit(ALU) having a '8+2N' bit wordlength and an accumulating register. Herein, '8' refers to the extra bits for overflow guarding commonly used. Because all the ALU and accumulating register is lengthened at least twice more than the data wordlength N, an operation amount in the DSP is not only increased, but also a response speed of the DSP is reduced. Also, there are DSPs without the extra bits.

Actually, first and second data 10 and 12 having each an integer part and a fractional part and an N bit wordlength, as shown in FIG. 1, is read out of memory(not shown), and multiplied by means of a multiplier 14. A multiplied data having at most 2N bit length is generated at the multiplier 14. Such a multiplied data is temporarily stored in a product register 16. The multiplied data stored in the product register 16 is moved toward an accumulating register 20 through an ALU(18) in a state in which it is shifted by the bit number corresponding to the integer parts of the first and second data. The data removed to the accumulating register 20 has a new value in the case of data being operated by the ALU. An overflow can be generated in the data which is stored in the accumulating register 20. To this end, a serious error is generated in the data of the accumulating register 20. In order to reduce the serious error caused by the overflow, DSPs in TMS320C5x series developed by Texas Instrument Co. Ltd., have a saturation operating function instead of having the overflow prevention bits. On the other hand, DSPs of DSP5600x series developed by Motorola Corp. add 8 extra bits to the accumulating register 20 for the purpose of overflow guarding as shown in FIG. 1. In this case, the ALU and the accumulating register 20 included in the DSP have a '8+2N' bit length. When the 8 bit of extra bits are applied to the DSP having a 24 bit wordlength, each of the ALU and the accumulating register 20 included in the DSP has a 56 bit length; while when the 8 bit of extra bits are applied to the DSP having a 20 bit wordlength, each of them has a 46 bit length. The ALU and accumulating register, having a wordlength of more than 48 bits causes the die size of the DSP chip as well as the manufacturing cost thereof to be increased. Also, the operating speed of the DSP becomes slow because a propagation delay amount, in the ALU having a large wordlength, is great.

The data stored in the accumulating register 20, hereinafter referred to as "accumulated data", is saturated prior to being transferred to the memory. By this saturation process, the accumulated data is changed into a third data 22 having a bit length equal to the first and second data 10 and 12. Prior to performing such a saturation process, some DSP allows a rounding operation to be performed. For example, the DSP of Motorola corp. converts the '8+2N' bit data stored in the accumulator 20 into a '8+N' bit data under a command word 'rnd'. The saturation process to be performed after that time, changes the rounded data into an N bit of third data 22.

The DSPs using the method as described above, additionally wastes one command word or one clock period for the rounding operation. Due to this, clock periods additionally wasted become great when the rounding operation is involved in a code segment including a looping or a block repeating. As a result, an operation amount performed by the DSP increases.

Furthermore, the DSP in TMS320C5x model of Texas Instrument Co. Ltd. shift the data to be calculated with the ALU to the left by 0 to 16 bits using a pre-scaling shifter arranged at the previous stage of the ALU. In this case, the shift operation from the '0' numbered bit to the '15' numbered bit is usually used for scaling the data, but the shift operation to the '16' numbered bit is used when performing a fixed-point arithmetic rather than an integer arithmetic. This results from a fact that the 16 bit data read out of the memory must be arrayed to high order bits of the 32 bit accumulating register. The shift operation from the '0' numbered bit to the '15' numbered bit for scaling the data may or may not be used effectively depending upon a given algorithm, particularly upon a algorithm coding method. When performing an algorithm implemented with a code in which the pre-scaling is not used effectively, the pre-scaling shifter causes the die size of the DSP chip to be enlarged and the propagation delay amount to be increased, without any useful advantage. For example, the pre-scaling shifter included in the DSP of Motorola Corp. shift the data, by one bit, to the left or the right. Instead, the DSP of Motorola Corp. provides different multiplying command words for the fixed-point arithmetic and the integer arithmetic, thereby absorbing an operation which shifts the data, by 16 bits, to the left in the TMS320C5x of Texas Instrument Co. Ltd.

SUMMARY OF THE INVENTION

Accordingly, it is an object of the present invention to provide a digital signal processor that includes an ALU and an accumulating register having a short wordlength.

Further object of the present invention is to provide a digital signal processor that does not waste an additional clock period at the time of rounding of data.

Another object of the present invention is to provide a digital signal processor that is capable of effectively performing an integer arithmetic and/or a fixed-point arithmetic.

Still another object of the present invention is to provide a digital signal processor that is capable of performing an operation including a data scaling in a high speed.

Still another object of the present invention is to provide a digital signal processor that can eliminate a rounding procedure of data.

In order to achieve these and other objects of the invention, a digital signal processor according to an aspect of the present invention includes data input means for receiving a N-bit data; rounding bit adding means for adding r-bit rounding bits to the N-bit data from the data input means, wherein r is smaller than N; guard bit adding means for adding g-bit guard bits to the high-order bits of the data from the rounding bit adding means; means for operating the data from the guard bit adding means; and rounding/saturation means for making a rounding process, a saturation process and a combined process including the rounding and saturation processes for the data from the operating means.

A digital signal processor according to still another aspect of the present invention includes data input means for receiving an N-bit data; an alignment unit for aligning the N-bit data from the data input means to the left of (N+r)-bit bus; means for operating the data from the (N+r)-bit bus; and deriving means for deriving only the high-order N bits from the data from the operating means.

A digital signal processor according to still another aspect of the present invention includes input means for receiving an N-bit data; means for operating the data from the input means and a data from a feedback loop; a memory connected to the feedback loop for temporarily storing the data from the operating means; means for scaling the data from the input means; and selecting means for selectively transferring the data from the scaling means and the data from the operating means to the memory.

A digital signal processor according to still another aspect of the present invention includes data input means for receiving a N-bit data; guard bit adding means for adding g-bit guard bits to the high-order bits of the N-bit data from the data input means; means for operating the data from the guard bit adding means; and saturating means for making a saturation process of the data in accordance with logical values of the high-order (g+1) bits of the data from the operating means.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
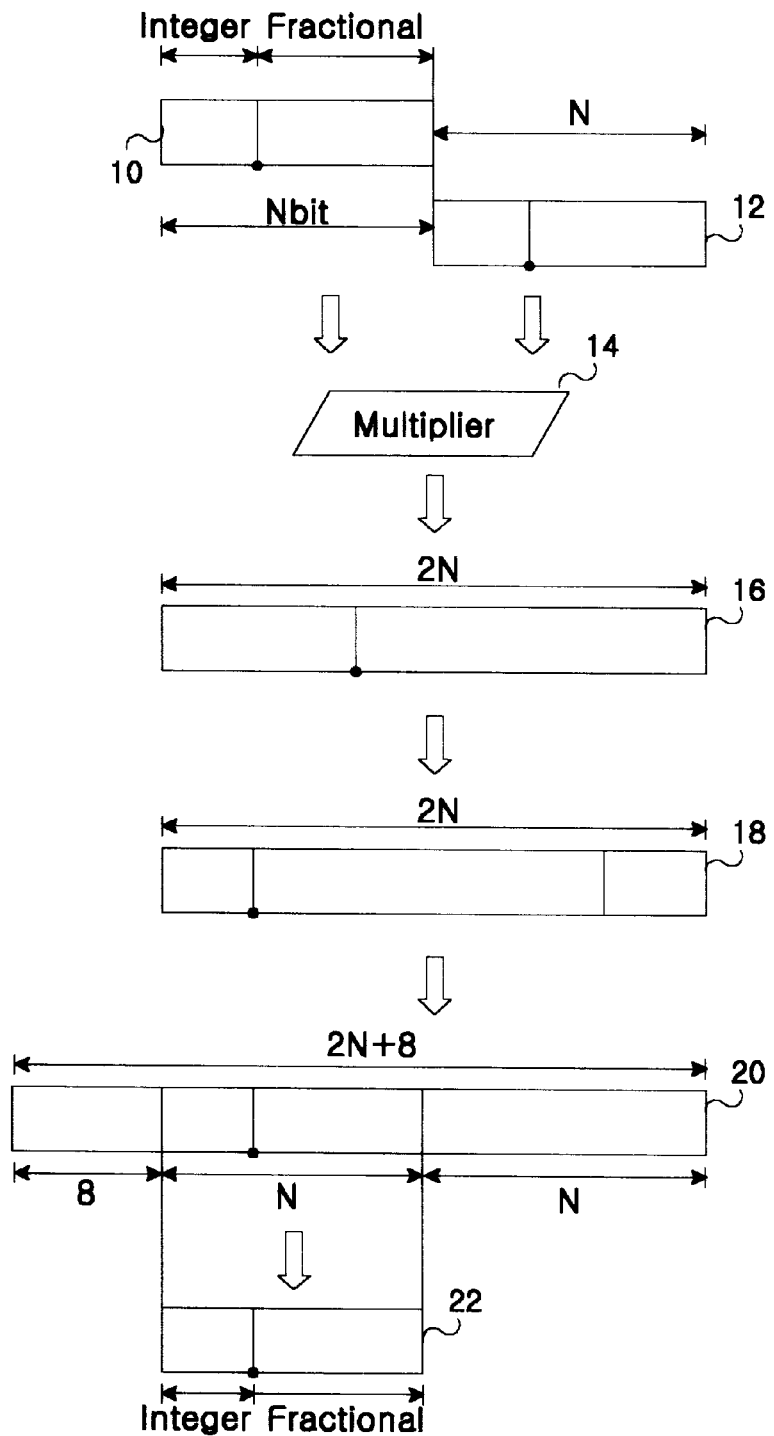
FIG. 1 is a view for schematically explaining an operation procedure in the conventional DSP of fixed-point arithmetic system.
Figure 2:
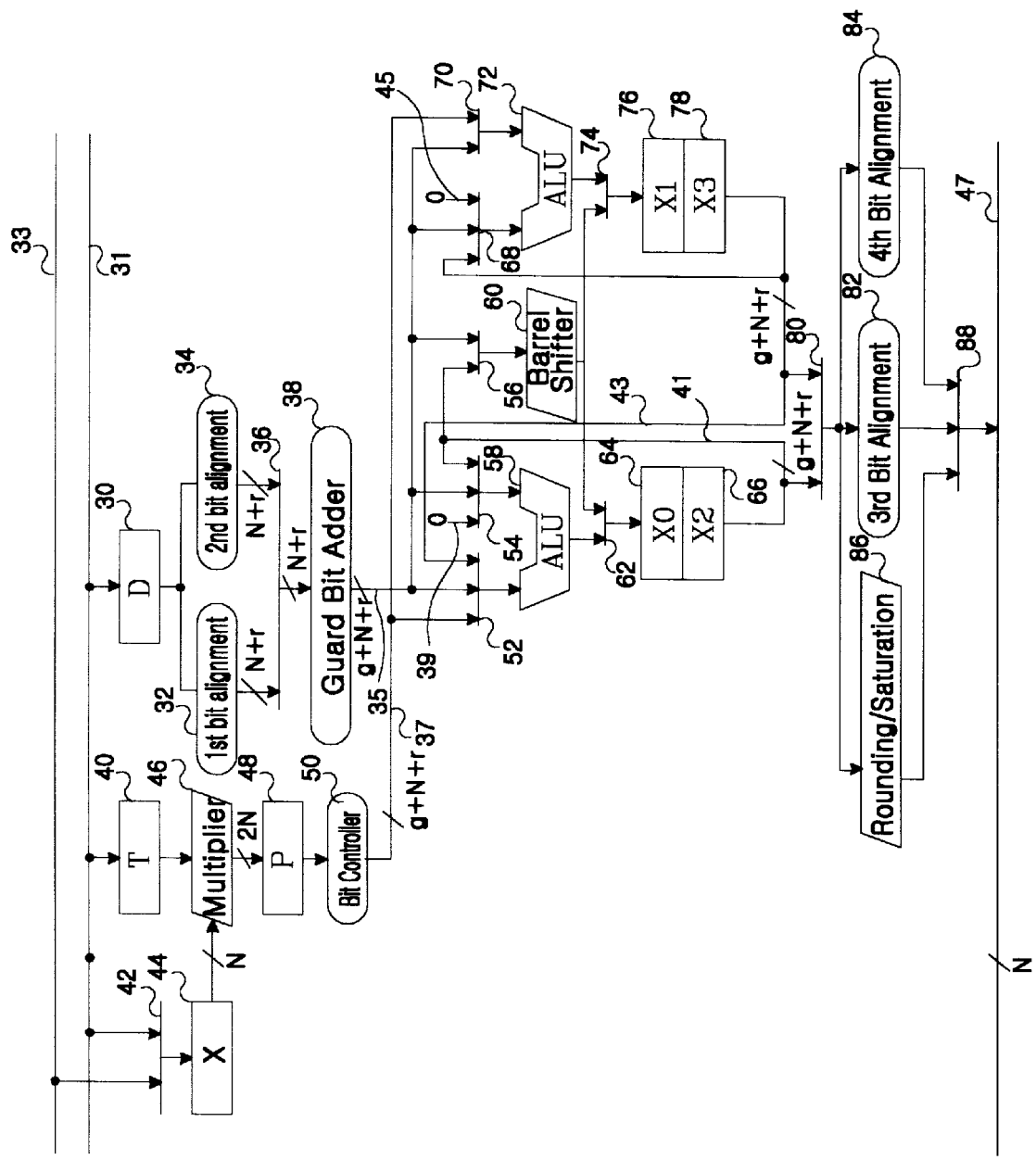
FIG. 2 is a schematic view showing a configuration of a DSP according to an embodiment of the present invention.

Referring to FIG. 2, there is shown a DSP according to an embodiment of the present invention that includes a first register 30 for receiving N bit data from a first external bus 31, and first and second bit alignment units 32 and 34 that are connected, in parallel, to the first register 30. The first external bus 31 is composed of N data lines commonly connected to a working memory(not shown), and which is used as an N bit first read-only data bus. The first register 30 temporarily stores the N bit data from the memory by way of the first external bus 31. The first and second bit alignment units 32 and 34 align the N bit data from the first register 30 at the left or right of (N+r) bit bus to thereby extend the data from N bit into (N+r) bit. More specifically, the first bit alignment unit 32 has a wiring that connects N bit output lines of the first register 30 to high-order N input terminals of the first input port consisting of (N+r) terminals of a first multiplexor 36. The second bit alignment unit 34 has a wiring that connects the N bit output lines of the first register 30 to low-order N input terminals of the second input port consisting of (N+r) terminals of the first multiplexor 36. At this time, the high-order r bits are occupied with sign bits(positive(+) or negative(−) bits), or a value of '0' in accordance with a sign-extension mode of the DSP. The first multiplexor 36 supplies (N+r) bit data at the first input port or (N+r) bit data at the second input port to a first guard bit adder 38 in accordance with a type of operation, that is, the fixed-point/integer arithmetic. The first guard bit adder 38 adds the (N+r) bit data from the first multiplexor 36 to guard bits of g bit. All the g bit of guard bits are set to '0' or extends a sign of data. More specifically, all the g bit of guard bits have bits of logical value equal to the sign bit of (N+r) bit data when the sign-extension mode is set, and have bits of logical value of '0' when the sign-extension mode is reset. The sign-extension mode is set or reset under a specific command word. In order to add the g-bit guard bits to the (N+r) bit data, the first guard bit adder 38 has a wiring that connects the output port of the first multiplexor 36 consisting of (N+r) terminals to low-order (N+r) lines in (g+N+r) lines included in a first internal bus 35.

The DSP further includes a second register 40 and a multiplier 46 that are connected, in series, to the first external bus 31, and a second multiplexor 42 connected to the first and second external buses 31 and 33. The second register 40 is responsible for temporarily storing the N bit data from the memory received via the first external bus 31 like the first register 30. The second external bus 33 is composed of N lines commonly connected to a programmable memory and the second working memory, not shown, and which is used as the second read-only data bus. The second multiplexor 42 supplies to a third register 44 any one of the N bit data from the first external bus 31 supplied to its first input port and the N bit data from the second external bus 33 supplied to its second input port. The third register 44 temporarily stores the N bit data from the second multiplexor 42. The multiplier 46 multiplies two data stored in the second and third registers 40 and 44. The result multiplied by the multiplier 46 has 2N bit. Accordingly, a fourth register 48 for temporarily storing the data from the multiplier 46 must have a length of 2N bit. A bit alignment/guard bit adder 50 connected between the fourth register 48 and a second internal bus 37 converts the 2N bit data stored in the fourth register 48 into (N+r) bit data (wherein 2N>N+r) and adds g-bit guard bits to the converted (N+r) bit data.

The DSP further includes third to fifth multiplexors 52 to 56 commonly connected to the first internal bus 35. The third multiplexor 52 has first to third input ports for receiving (g+N+r) bit data from the first, second and fourth internal buses 35, 37 and 43, respectively. The third multiplexor 52 supplies any one of three data from the first, second and fourth internal buses 35, 37 and 43 to a first ALU 58. The fourth multiplexor 54 includes a first input port 39 for receiving a logical value of '0', and second and third input ports for receiving the (g+N+r) bit data from the second and third internal buses 35 and 41. The first ALU 58 operates two data from the third and fourth multiplexors 52 and 54 and supplies the operated result to a sixth multiplexor 62. The fifth multiplexor 56 also supplies the (g+N+r) bit data from the first internal bus 35 and the (g+N+r) bit data from the third internal bus 41 to a barrel shifter 60 selectively. The barrel shifter 60 scales a logical value of the data from the fifth multiplexor 56 and supplies the scaled data to the sixth multiplexor 62. For such a data scaling, the barrel shifter 60 shifts the data from the fifth multiplexor 56, by the bit number corresponding to a scaling amount, to the left or the light. Also, the barrel shifter 60 is connected, in parallel, to the first ALU 58 to minimize a propagation delay time of data. Accordingly, the DSP can perform the four arithmetical operations, the scaling, the four arithmetical operations including the scaling at a high speed. The sixth multiplexor 62 selectively supplies the four-arithmetical operated data of the (g+N+r) bit from the first ALU 58 and the scaled data from the barrel shifter 60 to a fifth or sixth register 64 or 66. The data stored in the fifth or sixth register 64 or 66 is supplied to the third internal bus 41. The fifth and sixth registers 64 and 66 are accumulating registers, which configures a first accumulator along with the first ALU 58. The fifth and sixth registers 64 and 66 have a length of (g+N+r) bit so as to temporarily store the (g+N+r) bit data, and the third internal bus 41 also consists of (g+N+r) lines.

The DSP further includes a seventh multiplexor 68 connected to the first and fourth internal buses 35 and 43, and an eighth multiplexor 70 connected to the first and second internal buses 35 and 37. The seventh multiplexor 68 includes a first input port 45 for receiving a logical value of '0', and second and third input ports for receiving the (g+N+r) bit data from the first and fourth internal buses 35 and 43, respectively. The seventh multiplexor 68 supplies any one of three data at its first to third input ports to a second ALU 72. The eighth multiplexor 70 has first and second input ports for receiving the (g+N+r) bit data from the first and second internal buses 35 and 37, respectively. The eighth multiplexor 70 supplies any one of two data from the first and second internal buses 35 and 37 to the second ALU 72. The second ALU 72 operates two data from the seventh and eighth multiplexors 68 and 70 and supplies the operated result to a ninth multiplexor 74. The ninth multiplexor 74 selectively supplies the operated data of (g+N+r) bit from the second ALU 72 and the scaled data from the barrel shifter 60 to the seventh or eighth register 76 or 78. The seventh or eighth register 76 or 78 supplies the data from the ninth multiplexor 74 to the fourth internal bus 43. The seventh or eighth register 76 or 78 is an accumulating register, which constitutes a second accumulator along with the second ALU 72. The second accumulator is connected, in parallel, to the first accumulator to make a parallel operation of a plurality of complex arithmetic equations. Each of the seventh and eighth registers 76 and 78 has a length of (g+N+r) bit so as to temporarily store the (g+N+r) bit data. Also, the seventh and eighth registers 76 and 78 allow a number of complex arithmetic equations to be operated at a high speed along with the fifth and sixth registers 64 and 66.

Furthermore, the DSP includes a tenth multiplexor 80 for selecting two (g+N+r) bit data from the third and fourth internal buses 41 and 43, and third and fourth bit alignment units 82 and 84 commonly connected to the tenth multiplexor 80, and a rounding/saturation processor 82. The tenth multiplexor 80 commonly supplies to the third and fourth bit alignment units 82 and 84 and the rounding/saturation processor 86 any one of the (g+N+r) bit data, via the third internal bus 41, from the fifth or sixth register 64 or 66 and the (g+N+r) bit data, via the fourth internal bus 23, from the seventh or eighth register 76 or 78. The third and fourth bit alignment units 82 and 84 derive only N bits from the (g+N+r) bit data from the tenth multiplexor 80 and supplies the derived N bit data to the first and second input ports of the eleventh multiplexor 88. More specifically, the third bit alignment unit 82 derives only high-order (g+1)th bit to low-order N bit data in the (g+N+r) bit data from the tenth multiplexor 80 and supplies the derived N bit data to the first input port of the eleventh multiplexor 88. To this end, the third bit alignment unit 82 includes a wiring that connects N terminals from the high-order (g+1)th terminal, that is, the remaining N terminals except for the high-order g terminals and the low-order r terminals, in the (g+N+r) output terminals of the tenth multiplexor 80 to the first input port of the eleventh multiplexor 88 consisting of N terminals. The third bit alignment unit 82 converts the (g+N+r) bit data into N bit data only by means of the wring. The fourth bit alignment unit 84 derives only low-order N bit data in the (g+N+r) bit data from the tenth multiplexor 80 and supplies the derived N bit data to the second input port of the eleventh multiplexor 88. To this end, the fourth bit alignment unit 84 includes a wiring that connects the low-order N terminals, that is, the remaining N terminals except for the high-order (g+r) terminals, in the (g+N+r) output terminals of the tenth multiplexor 80 to the second input port of the eleventh multiplexor 88 consisting of N terminals. The fourth bit alignment unit 84 does not require a separate circuit block because it is configured with only the wiring along with the first to third bit alignment units 32, 34 and 82. Accordingly, the first to fourth bit alignment units 32, 34, 82 and 84 are capable of simplifying the circuit configuration of DSP as well as performing the fixed-point and integer arithmetical operations in a high speed.

The rounding/saturation processor 86 is driven in a rounding process mode, a saturation process mode or a combined mode under a command from a controller(not shown). In the rounding mode, the rounding/saturation processor 86 checks a logical value of "r"th bit in the (g+N+r) bit data from the tenth multiplexor 80. If the logical value of low-order "r"th bit is 1, the rounding/saturation processor 86 eliminates low-order r bits from the (g+N+r) data to generate a (g+N) bit data. The (g+N) bit data is added to 1 by means of the rounding/saturation processor 86. The g bits are removed from the added (g+N) bit data to generate N bit data. The rounding/saturation processor 86 applies the N bit data to the eleventh multiplexor 88. Subsequently, in the saturation mode, the rounding/saturation processor 86 processes the data in accordance with the logical value of the high-order (g+1) bits from the (g+N+r) bit data from the tenth multiplexor 80. More specifically, the rounding/saturation processor 86 determines the generation of overflow in accordance with whether or not all logical values of the high-order (g+1) bits(i.e., g guard bits and one sign bit) in the (g+N+r) bit data from the tenth multiplexor 80 are same. If so, the rounding/saturation processor 86 supplies the remaining N bit data except for the high-order g bit and the low-order r bit in the (g+N+r) bit data from the tenth multiplexor 80 to the third input port of the eleventh multiplexor 88 as the operated result. Otherwise, if not, the rounding/saturation processor 86 determines whether a logical value of most significant bit of g guard bits is '0' or '1'. If a logical value of the most significant bit is '0', then the rounding/saturation processor 86 considers the data from the tenth multiplexor 80 to be a positive(+) data provided with an overflow and supplies a maximum value of N bit data(i.e., "0111 . . . 11"), in which only the most significant bit has a logical value of '0', to the third input port of the eleventh multiplexor 88. Otherwise, if a logical value of the most significant bit is '1', the rounding/saturation processor 86 considers the data from the tenth multiplexor 80 to be a negative(−) data provided with an overflow and supplies N bit data(i.e., "1000 ... 00"), in which only the most significant bit has a logical value of '1', to the third input port of the eleventh multiplexor 88. As described above, the saturation processor 86 accurately process a saturated logical value(i.e., a logical value generating an overflow) of the data operated by means of the ALU 58 or 72 based on logical values of guard bits and a sign bit. In the combination mode, the rounding/saturation processor 86 performs the rounding process for the (g+N+r) bit data from the tenth multiplexor 80 and then performs the saturation process for the rounded (g+N) bit data. The N bit data rounded and saturated using the rounding/saturation processor 86 in the above manner is applied to the eleventh multiplexor 88. In this case, the rounding/saturation processor 86 first performs the rounding process for the low-order bits, but performs the rounding and saturation process within one clock period, so that it does not waste an additional rounding process time. Accordingly, the rounding/saturation processor 86 provides an advantage in that it can round the fixed-point operated data without wasting an additional clock. The eleventh multiplexor 88 transfers any one of three N bit data form the third and fourth bit alignment units 82 and 84 and the rounding/saturation processor 86 to the third external bus 47. The third external bus 47 consists of N lines including a write only data bus and a write only address bus.

Figure 3:
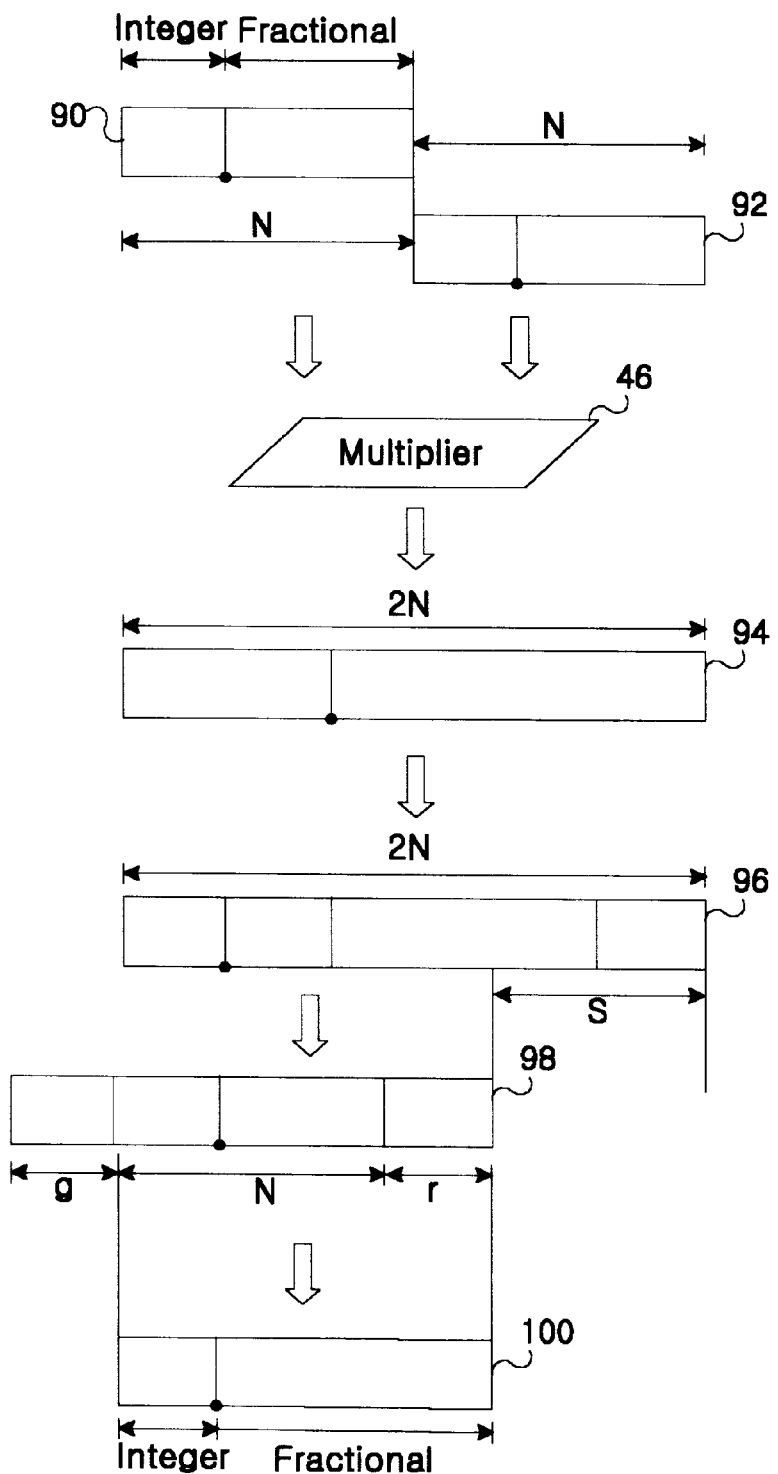
FIG. 3 is a view for explaining a fixed-point arithmetic procedure in which a rounding bit number is reduced to r smaller than a data bit number N by means of the rounding/saturation processor 86 shown in FIG. 2.

FIG. 3 shows a fixed-point arithmetic procedure, in which the number r of rounding bit is smaller than the number N of data bit, using the rounding/saturation processor 86 in FIG. 2. In FIG. 3, first and second data 90 and 92 is sequentially read out of a memory(not shown) and each of which has a length of N bit. The most significant bit of each first and second data 90 and 92 includes a single sign bit indicating whether its logical values is positive number or negative number. The first and second data 90 and 92 are operated by the multiplier 46 shown in FIG. 2 to generate a third data 94 having a length of 2N bit. This third data 94 is changed into a (g+N+r)-bit fifth data 98 by means of the bit alignment/guard bit adder 50 shown in FIG. 2, wherein g and r represent the number of guard bits and the number of rounding bits, respectively. The fifth data 98 is obtained by cutting away s-bit low-order bits from the fourth data 96 and which becomes to be a shape of input and output data of the ALUs 54 and 72. Further, the fifth data 98 is temporarily stored in the accumulating register 64 or 76, or 66 or 78 having a length of (g+N+r) bit by way of the ALU 58 or 72. The fifth data 98 stored in the accumulating register 64 or 76, or 66 or 78 is converted into a sixth data 100 having a length of N bit by processing it using the rounding/saturation processor 86 shown in FIG. 5. In a rounding-off/saturation combined mode, the fifth data 98 is first converted into a (g+N) bit data by rounding off it and, thereafter, is saturated in a different manner in accordance with whether or not logical values of the high-order (g+l) bits(i.e., g guard bits and one sign bit) are same and whether the most significant guard bit is '1' or '0', whereby it is finally converted into N bit data. If logical values of the high-order (g+1) bits are same, then the remaining N bits except for the high-order g bits in the rounded-off (g+N) bit data are converted into a sixth data 100. If logical values of the high order (g+1) bits are not same and the most significant bit is '0', then the rounded-off (g+N) bit data is regarded as a positive(+) data generating an overflow and converted into a N-bit sixth data 100, i.e., 0111 ... 11" in which the most significant bit only has a logical value of '0'. Otherwise, if logical values of the high-order (g+1) bits are not same and the most significant bit is '1', then the rounded-off (g+N) bit data is regarded as a negative(−) data generating an overflow and converted into a N-bit sixth data 100, i.e., "1000 ... 00" in which the most significant bit only has a logical value of '1'. In such a procedure, the saturation process is omitted in the rounding-off mode while the rounding-off mode is omitted in the saturation mode. The sixth data 100 calculated finally in accordance with this operation procedure has a very approximate value including an error minimized as much as possible.

Figure 4:
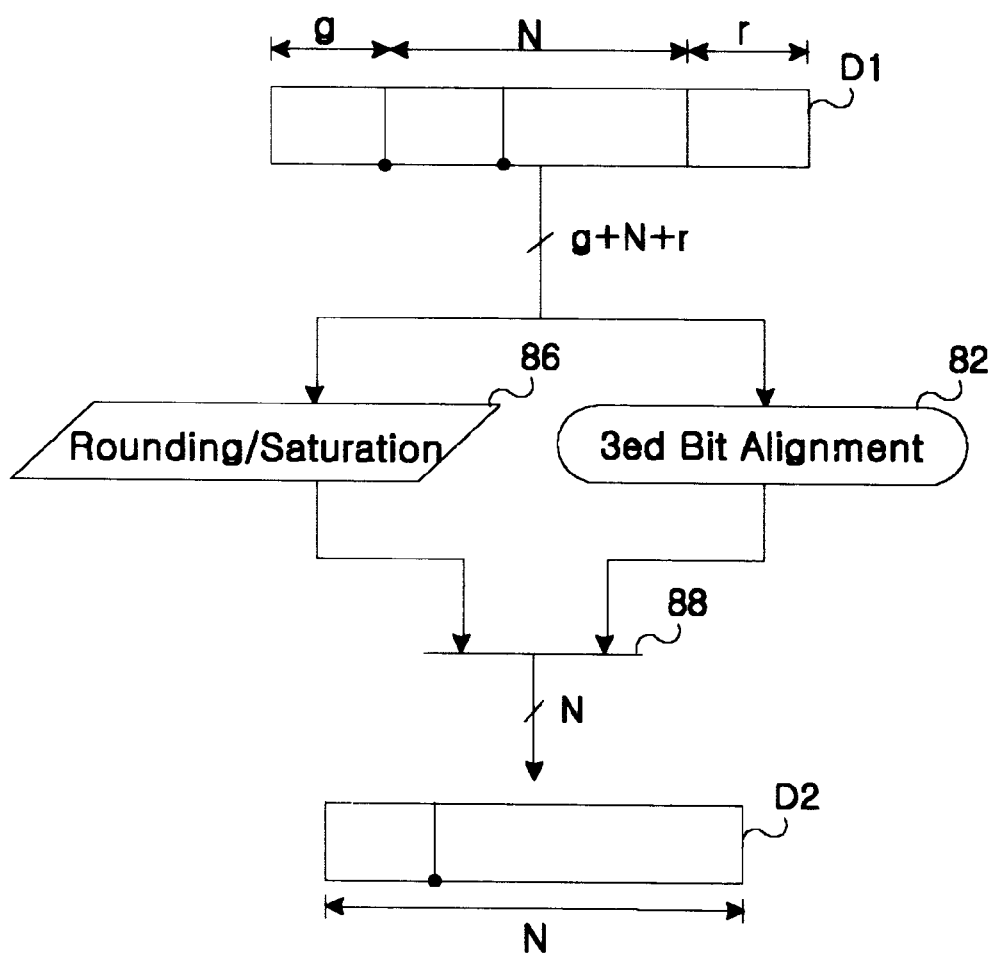
FIG. 4 is a view for showing the part of performing the data rounding in FIG. 2.

FIG. 4 shows a part of the DSP in FIG. 2 that performs the rounding of data. In FIG. 4, a (g+N+r)-bit first data D1 is operated by means of the ALU 58 or 72 and, thereafter, temporarily stored in any one of the accumulating registers 64, 66, 76 and 78. In the first data D1, g represents the number of guard bits, N is the number of data bits stored in the memory(not shown) and r is the number of rounding bits. The third bit alignment unit 82 converts the first data D1 into an N-bit second data D2 with the aid of the wiring as described with reference to FIG. 2 without an additional processing time. The rounding/saturation processor 86 rounds the first data D1 and then saturates the rounded data as described with reference to FIG. 2, thereby converting it the N-bit second data D2. The eleventh multiplexor 88 selects an output data of the rounding/saturation processor 86 and an output data of the third bit alignment unit 32 in accordance with whether any one of a passing mode, the rounding process mode, the saturation process mode and the combined mode is selected by a command from a controller (not shown). More specifically, the eleventh multiplexor 88 selects the output data of the rounding/saturation processor 86 when one of the rounding process, saturation process and combined modes is selected. On the other hand, when the pass mode is selected, the eleventh multiplexor 88 selects an output data of the third bit alignment unit 82. By means of the rounding/saturation processor 86, the third bit alignment unit 82 and the eleventh multiplexor 88, the DSP does not waste an additional time(i.e., a clock period) and hence process the data at a high speed.

Figure 5:
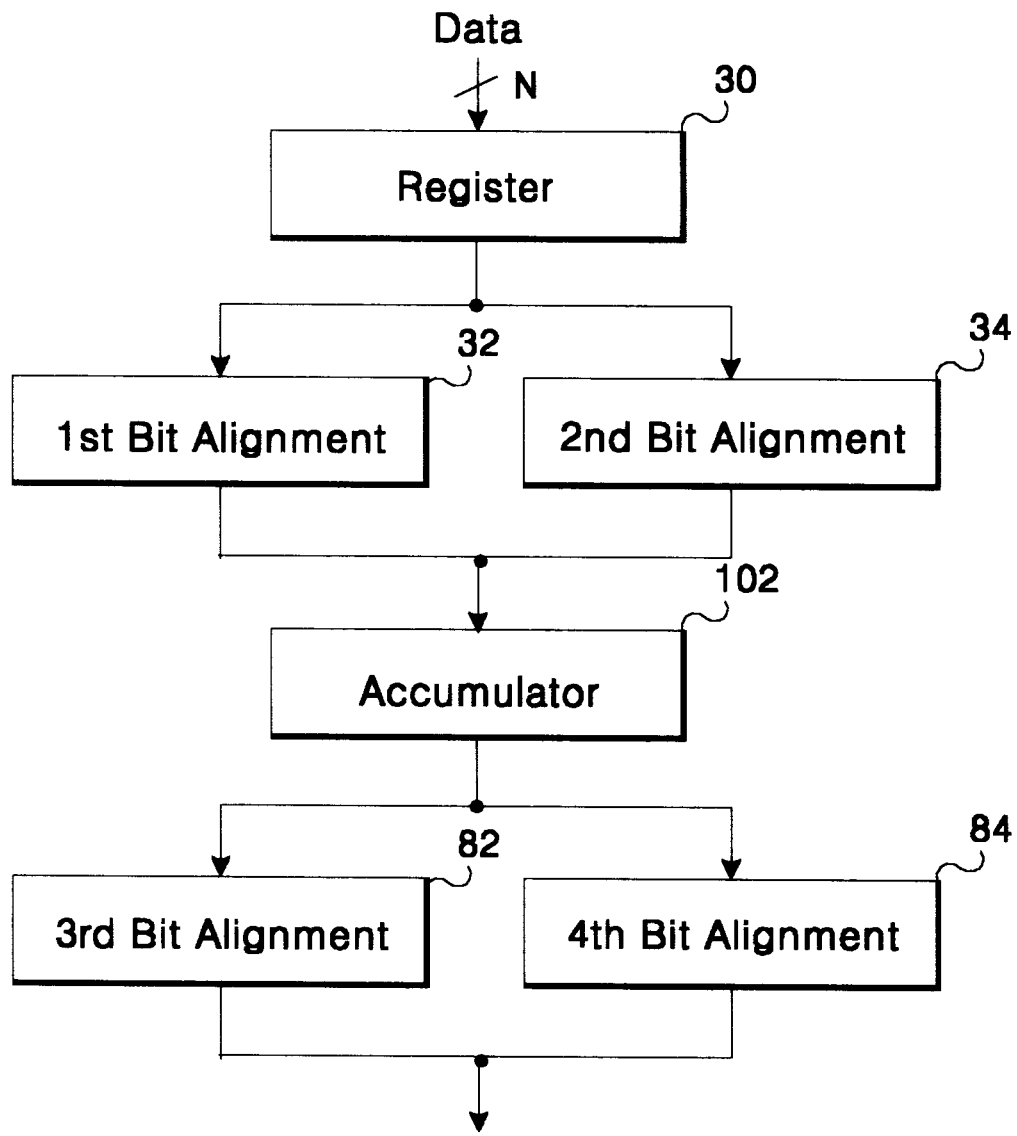
FIG. 5 is a block diagram for explaining the fixed-point arithmetic procedure and the integer arithmetic procedure in FIG. 2.
Figure 6:
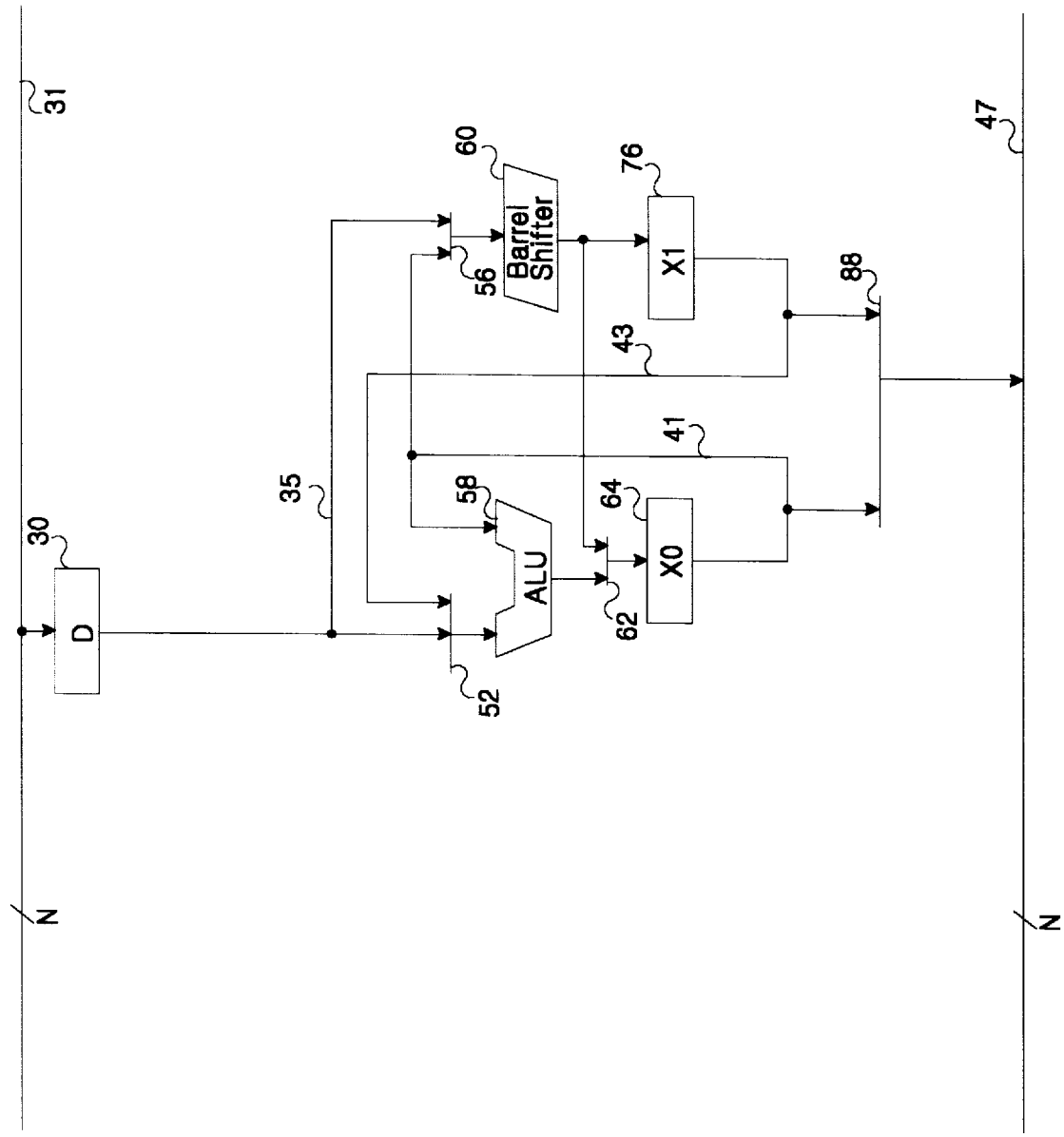
FIG. 6 is a view for showing the part of performing an operation including the scaling in the DSP of FIG. 2.

FIG. 5 is a block diagram for explaining the fixed-point arithmetic process and the integer arithmetic process in FIG. 2. In FIG. 5, the register 30 stores the N bit data from the memory(not shown) temporarily. The first bit alignment unit 32 aligns the N bit data from the register 30 to the left of the (N+r)bit bus with the aid of the wiring. Likewise, the second bit alignment unit 34 aligns the N bit data from the register 30 to the right of the (N+r) bit bus with the aid of the wiring. Then, the logical value of high-order r bits is determined according to the sign extension mode. That is, if the sign extension mode is set up, all the high-order r bits have a sign bit of the N bit data. On the contrary, all the high-order r bits have "0" when the sign extension mode is reset. The accumulator 102 receives the (N+r) bit data from the first bit alignment unit 32 to perform a fixed-point arithmetic, or receives the (N+r) bit data from the second bit alignment unit 34 to perform an integer arithmetic. The accumulator 102 is provided with the ALU 58 or 72 and the registers 64 and 66, or the registers 76 and 78. The third bit alignment unit 82 transfers only the high-order N bits in the (N+r) bit data from the accumulator 102 to the memory with the aid of the wiring structure. Accordingly, the first and third bit alignment units 32 and 82 align the data to the left by means of the wiring, thereby performing the fixed-point arithmetic at a high speed. The fourth bit alignment unit 84 transfers only the low-order N bits in the (N+r) bit data from the accumulator 102 to the memory with the aid of the wiring structure. Accordingly, the second and fourth bit alignment units 34 and 84 align the data to the right by means of the wiring, thereby performing the integer arithmetic at a high speed. By aligning the data with the aid of the wiring as described above, the DSP does not require an additional circuit block such as shifter and allows the fast fixed-point and integer arithmetics. FIG. 6 shows a circuit configuration for performing a adding/subtracting arithmetical operation including a scaling in the DSP of FIG. 2. In FIG. 6, the barrel shifter 60 is coupled to the first ALU 58 in parallel and commonly connected to two accumulating registers 64 and 76. When the adding/subtracting arithmetical operation includes scaling, the accumulating register 76 temporally stores data scaled previously by the barrel shifter 60. The data stored in the accumulating register 76 is applied to the first ALU 58 to be performed by the adding/subtracting arithmetical operation, during the next cycle. A result of the adding/subtracting arithmetical operation is stored in the accumulating register 64. The circuitry structure as described above has a critical path shorter than DSPs in TMS320C5x series which are developed by Texas Instrument Co. Ltd. and have a serial circuit of the barrel shifter and ALU. Furthermore, the circuitry structure is effective rather than DSPs having only one register and a parallel circuit of the barrel shifter and ALU. That is, the circuit structure consumes cycles smaller than other DSPs. More specifically, the data progresses from the first external bus 31, via the first register 30, the third multiplexor 52, the first ALU 58, the sixth multiplexor 62, the fifth register 64 and the eleventh multiplexor 88 in turn, to the third external bus 47; from the first external bus 31, via the first register 30, the fifth multiplexor 56, the barrel shifter 60, the sixth multiplexor 62, the fifth register 64 and the eleventh multiplexor 88 in turn, to the third external bus 47; or from the first external bus 31, via the first register 30, the fifth multiplexor 56, the barrel shifter 60, the seventh register 76 and the eleventh multiplexor 88 in turn, to the third external bus 47. The barrel shifter 60 is connected, in parallel, to the first ALU 58, so that the DSP is capable of minimizing the propagation delay time. Also, the number of clock required for the operation can be minimized because two accumulating registers are provided to one ALU. Accordingly, the DSP can perform the adding/subtracting arithmetical operation, the scaling, and the adding/subtracting arithmetical operation including the scaling at a high speed.

Figure 7:
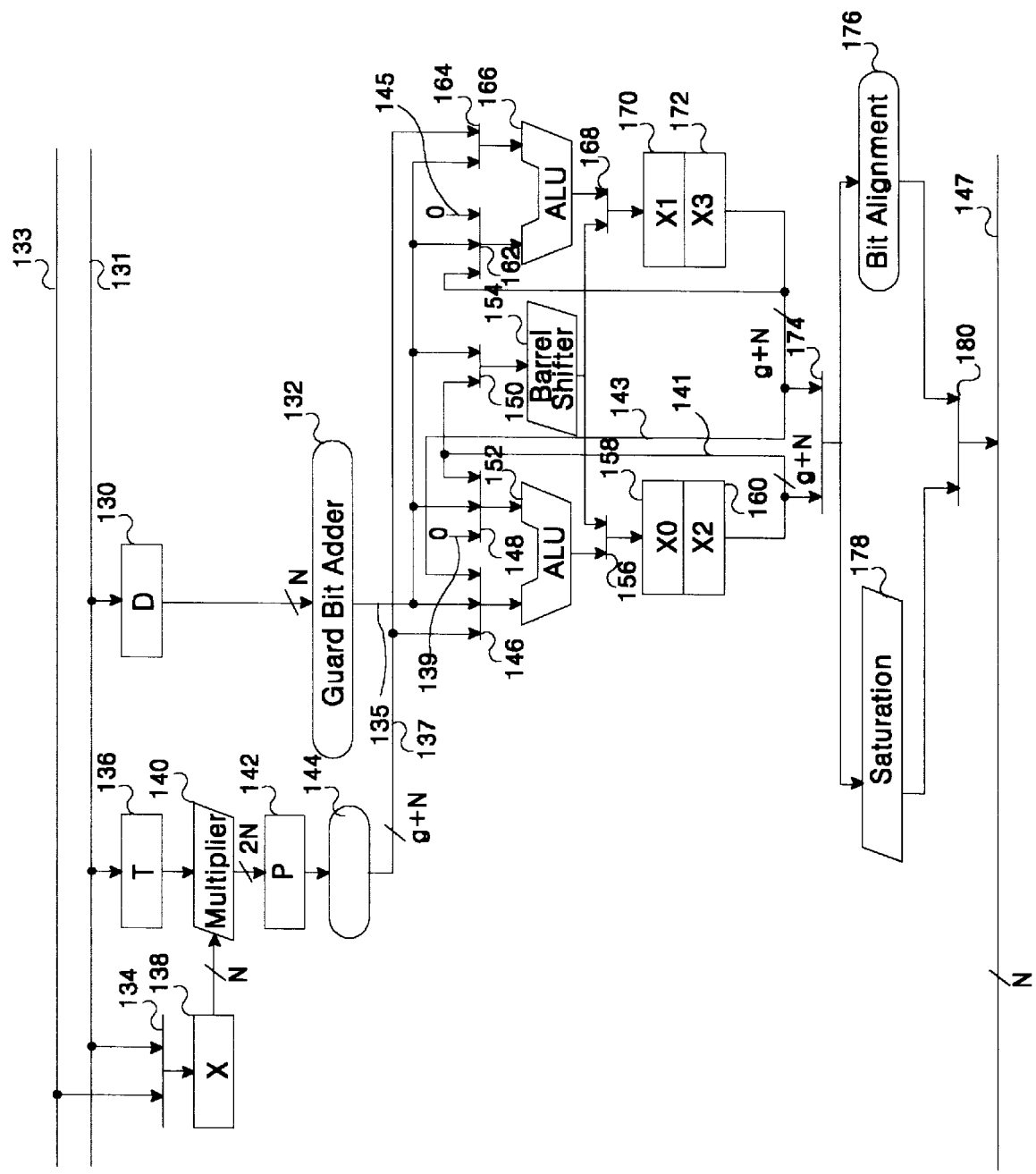
FIG. 7 is a schematic view showing a configuration of a DSP according to another embodiment of the present invention.

Referring to FIG. 7, there is shown a DSP according to another embodiment of the present invention. The DSP shown in FIG. 7, is most suitable for performing "AC-3" suggested as an audio compression and reconstruction algorithm by Dolby Co. Ltd. More specifically, the DSP of FIG. 7 performs effectively signal processing steps for recovering a pulse code modulated signal from a signal compressed by means of the AC-3. An accumulating register and ALU included in the DSP of FIG. 7 have a word length shorter than those in prior DSPs. Actually, if the word length of data is N, the DSP according to another embodiment of present invention requires a accumulating register and ALU each having (g+N) bit length. That is, the number of rounding bits is established as "0" so that the effect of the DSP having a (g+N+r) bit ALU and accumulating register is maximized. In the DSP including the (g+N) bit ALU and accumulating register, an FFT coefficient storing and butterfly arithmetical operation must be appropriately performed to minimize arithmetical errors generated at the arithmetical operation. This results from that the arithmetical errors are large or small in accordance with the selection of the storing and operating methods. To select the storing and operating methods appropriately, it is identified whether the errors are offset or not, through an analysis of the fixed-point arithmetical operating steps. The process of selecting the storing and operating methods will be described in the following.

Return to FIG. 7, the DSP according to another embodiment of the present invention includes a first register 130 for receiving N bit data from a first external bus 131, and a guard bit adder 132 connected to the first register 130. The first external bus 131 is composed of N data lines commonly connected to a working memory(not shown), and which is used as an N-bit first read-only data bus. The first register 130 temporarily stores the N bit data from the memory by way of the first external bus 131. The guard bit adder 132 adds g-bit guard bits to the N bit data from the first register 130. The g-bit guard bits are set to '0' or extends a sign of data. More specifically, all the g-bit guard bits have a logical value identical to the sign bit of data when the sign-extension mode is set, and have a logical value of '0' when the sign-extension mode is reset. In order to add the g-bit guard bits to the N bit data, the guard bit adder 132 has a wiring that connects the output port of the first register 130 consisting of N terminals to the low-order N lines in (g+N) lines included in a first internal bus 135.

The DSP further includes a second register 136 and a multiplier 140 that are connected, in series, to the first external bus 131, and a first multiplexor 134 connected to the first and second external buses 131 and 133. The second register 136 is responsible for temporarily storing the N bit data from the memory received via the first external bus 131 like the first register 130. The second external bus 133 is composed of N lines commonly connected to a programmable memory and the second working memory, not shown, and which is used as the second read-only data bus. In the programmable memory, a cosine constant and a sine constant for the IFFT are stored as the same sign. This prevent a generation of error in the reverse transform. The first multiplexor 134 supplies to a third register 138 any one of the N bit data from the first external bus 131 supplied to its first input port and the N bit data from the second external bus 133 supplied to its second input port. The third register 138 temporarily stores the N bit data from the first multiplexor 134. The multiplier 140 multiplies two data stored in the second and third registers 136 and 138. The result multiplied by the multiplier 46 may have 2N bit. Accordingly, a fourth register 142 for temporarily storing the data from the multiplier 140 has a length of 2N bit. A bit controller 144 connected between the fourth register 142 and a second internal bus 137 converts the 2N bit data stored in the fourth register 142 into N bit data and adds g-bit guard bits to the converted (N+r) bit data. To this end, the bit controller 144 has a wiring that connects the output port of the fourth register 142 consisting of N terminals to the low-order N lines in the (g+N) lines included in the second internal bus 137.

The DSP further includes second to fourth multiplexors 146 to 150 commonly connected to the first internal bus 135. The second multiplexor 146 has first to third input ports for receiving a (g+N) bit data from the first, second and fourth internal buses 135, 137 and 143, respectively. The second multiplexor 146 supplies any one of three data from the first, second and fourth internal buses 135, 137 and 143 to a first ALU 152. The third multiplexor 148 includes a first input port 139 for receiving a logical value of '0', and second and third input ports for receiving the (g+N) bit data from the first and third internal buses 135 and 141. The third multiplexor 148 supplies any one of three data at its first to third input ports to the first ALU 152. The first ALU 152 operates two data from the second and third multiplexors 146 and 148 and supplies the operated result to a fifth multiplexor 156. The fourth multiplexor 150 also supplies the (g+N) bit data from the first internal bus 135 and the (g+N) bit data from the third internal bus 141 to a barrel shifter 154 selectively. The barrel shifter 154 scales a logical value of the data from the fourth multiplexor 150 and supplies the scaled data to the fifth multiplexor 156. For such a data scaling, the barrel shifter 154 shifts the data from the fourth multiplexor 150, by the bit number corresponding to a scaling amount, to the left or the right. Also, the barrel shifter 154 is connected, in parallel, to the first ALU 152 to minimize a propagation delay time of data. Accordingly, the DSP can perform the four arithmetical operations, the scaling, and the four arithmetical operations including the scaling at a high speed. The fifth multiplexor 156 selectively supplies the four-arithmetical operated data of the (g+N) bit from the first ALU 152 and the scaled data from the barrel shifter 154 to a fifth or sixth register 158 or 160. The data stored in the fifth or sixth register 158 or 160 is supplied to the third internal bus 141. The fifth and sixth registers 158 and 160 are accumulating registers, which configures a first accumulator along with the first ALU 152. The fifth and sixth registers 158 and 160 have a length of (g+N) bit so as to temporarily store the (g+N) bit data, and the third internal bus 141 also consists of (g+N) lines.

The DSP further includes a sixth multiplexor 162 connected to the first and fourth internal buses 135 and 143, and a seventh multiplexor 164 connected to the first and second internal buses 135 and 137. The sixth multiplexor 162 includes a first input port 145 for receiving a logical value of '0', and second and third input ports for receiving the (g+N) bit data from the first and fourth internal buses 135 and 143, respectively. The sixth multiplexor 162 supplies any one of three data at its first to third input ports to a second ALU 166. The seventh multiplexor 164 has first and second input ports for receiving the (g+N) data form the first and second internal buses 135 and 137, respectively. The seventh multiplexor 164 supplies any one of two data from the first and second internal buses 135 and 137 to the second ALU 166. The second ALU 166 operates two data from the sixth and seventh multiplexors 162 and 164 and supplies the operated result to an eighth multiplexor 168. The eighth multiplexor 168 selectively supplies the operated data of (g+N) bit from the second ALU 166 and the scaled data from the barrel shifter 154 to the seventh or eighth register 170 or 172. The seventh or eighth register 170 or 172 supplies the data from the eighth multiplexor 168 to the fourth internal bus 143. The seventh or eighth register 170 or 172 is an accumulating register, which constitutes a second accumulator along with the second ALU 166. The second accumulator is connected, in parallel, to the first accumulator to make a parallel operation of at least two complex arithmetic equations. Each of the seventh and eighth registers 170 and 172 has a length of (g+N) bit so as to temporarily store the (g+N) bit data. Also, the seventh and eighth registers 170 and 172 allow a number of complex arithmetic equations to be operated at a high speed along with the fifth and sixth registers 158 and 160.

Furthermore, the DSP includes a ninth multiplexor 174 for selecting two (g+N) bit data from the third and fourth internal buses 141 and 143, and a bit alignment units 176 and a saturation processor 178 commonly connected to the ninth multiplexor 174. The ninth multiplexor 174 commonly supplies to the bit alignment units 176 and the saturation processor 178 any one of the (g+N) bit data, via the third internal bus 41, from the fifth or sixth register 158 or 160 and the (g+N) bit data, via the fourth internal bus 123, from the seventh or eighth register 170 or 172. The bit alignment units 176 derive only N bits from the (g+N) bit data from the ninth multiplexor 174 and supplies the derived N bit data to the first input port of the eleventh multiplexor 180. More specifically, the bit alignment unit 176 derives only the low-order N bit data in the (g+N) bit data from the ninth multiplexor 174 and supplies the derived N bit data to the first input port of the tenth multiplexor 180. To this end, the bit alignment unit 176 includes a wiring that connects the low-order N terminals, that is, the remaining N terminals except for the high-order g terminals in the (g+N) output terminals of the ninth multiplexor 174 to the first input port of the tenth multiplexor 180 consisting of N terminals. The bit alignment unit 176 does not require an additional circuit block because it is configured with the wiring only. Accordingly, the bit alignment unit 176 is capable of simplifying the circuit configuration of the DSP and allows the fixed-point arithmetic to be performed at a high speed. The saturation processor 178 performs a saturation process under a command from a controller(not shown). The saturation processor 178 processes the data in accordance with logical values of the high-order (g+l) bits in the (g+N) bit data from the ninth multiplexor 174. More specifically, the saturation processor 178 determines the generation of overflow in accordance with whether or not all logical values of the high-order (g+l) bits(i.e., g guard bits and one sign bit) in the (g+N) bit data from the ninth multiplexor 174 are same. If so, the saturation processor 178 supplies the low-order N bit data in the (g+N) bit data from the ninth multiplexor 174 to the second input port of the tenth multiplexor 180 as the operated result. Otherwise, if not, the saturation processor 178 determines whether a logical value of the most significant bit of g guard bits is '0' or '1'. If a logical value of the most significant bit is '0', then the saturation processor 178 considers the data from the ninth multiplexor 174 to be a positive(+) data provided with an overflow and supplies a maximum value of N bit data(i.e., "0111 . . . 11"), in which only the most significant bit has a logical value of '0', to the second input port of the tenth multiplexor 180. Otherwise, if a logical value of the most significant bit is '1', the saturation processor 178 considers the data from the ninth multiplexor 174 to be a negative(−) data provided with an overflow and supplies N bit data(i.e., "1000 . . . 00"), in which only the most significant bit has a logical value of '1', to the second input port of the tenth multiplexor 180. As described above, the saturation processor 178 accurately process a saturated logical value(i.e., a logical value generating an overflow) of the data operated by means of the ALU 152 or 166 based on logical values of guard bits and a sign bit. As described above, in the data output from the ninth multiplexor 174, the saturation process only is performed, but the rounding process is not processed. This result in an improvement in the data operation speed. Th tenth multiplexor 180 transfers any one of two N bit data from the bit alignment unit 176 and the saturation processor 178 to the third external bus 147. The third external bus 147 consists of N lines including a write data bus and a write address bus.

Figure 8:
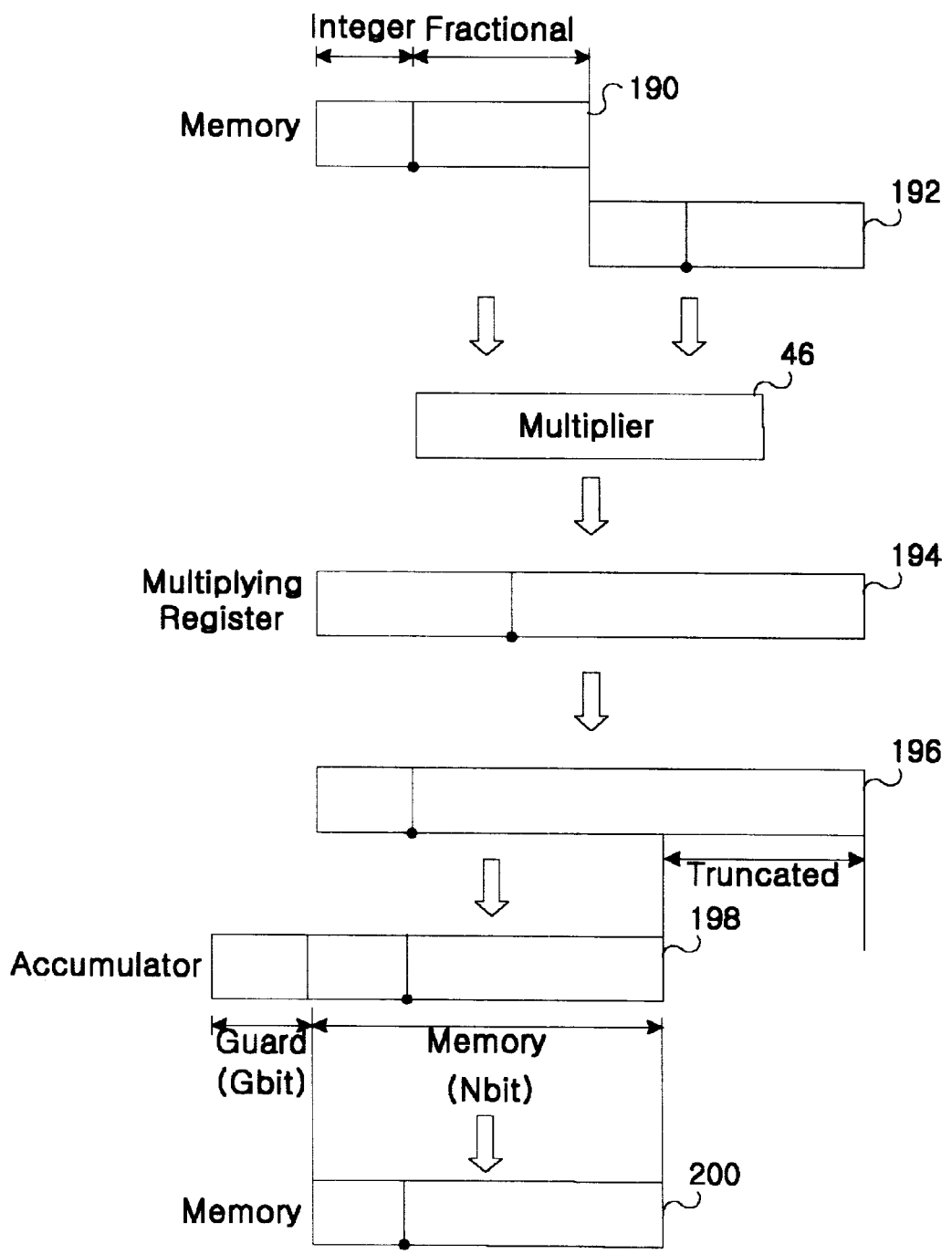
FIG. 8 is a schematic view for explaining a signal processing procedure in the DSP of FIG. 7.

FIG. 8 shows a fixed-point arithmetic procedure performed by means of the DSP in FIG. 7. In FIG. 8, first and second data 190 and 192 are sequentially read out of a memory(not shown) and each of which has a length of N bit. The most significant bit of each first and second data 190 and 192 includes a single sign bit indicating whether its logical values is positive number or negative number. The first and second data 190 and 192 are operated by the multiplier 140 shown in FIG. 5 to generate a third data 194 having a length of 2N bit. This third data 194 is shift by a predetermined bits when it is transferred from the multiplier 140 to the fourth register 142 and is converted into a fourth data 196. The fourth data 196 is converted into a fifth data 198 having a wordlength of (g+N) when it is transferred, via the bit controller 144 in FIG. 10, to the ALU 152 or 166. At this time, the bit controller 144 cuts away the low-order N bits of the fourth data 196 and adds g-bit guard bits to the remaining high-order bits of the N bits of the fourth data 196. The fifth data 198 is operated by means of the ALUs 152 and 166 and then temporarily stored in the accumulating register 158 or 170, or 160 or 172 having a length of (g+N) bit. The fifth data 198 stored in the accumulating register 158 or 170, or 160 or 172 is converted into a sixth data 200 having a length of N bit by processing it using the saturation processor 178 shown in FIG. 10. At this time, the fifth data 198 is processed in a different manner in accordance with whether or not logical values of the high-order (g+1) bits (i.e., g guard bits and one sign bit) are same and whether the most significant guard bit is '1' or '0', and it is finally converted into N bit data. If logical values of the high-order (g+1) bits are same, then the fifth data 198 is converted into the sixth data 200 having the remaining N bits except for the high-order g bits in the (g+N) bits. If logical values of the high order (g+1) bits are not same and the most significant bit is '0', then the fifth data 198 is regarded as a positive(+) data generating an overflow and converted into a N-bit sixth data 200, i.e., "0111 . . . 11" in which the most significant bit only has a logical value of '0'. Otherwise, if logical values of the high-order (g+1) bits are not same and the most significant bit is '1', then the fifth data is regarded as a negative(−) data generating an overflow and converted into a N-bit sixth data 200, i.e., "1000 . . . 00" in which the most significant bit only has a logical value of '1'. As described above, in the DSP according to the present invention, the lengths of ALU and accumulating register are reduced to (g+N) bits to thereby reduce the circuitry size. As a result, the response speed of the DSP according to the present invention becomes fast. It will be proved from an analysis of the quantization error generated in the operation procedure that the extent of error in the DSP according to an embodiment of the present invention is minimized.

First, it is assumed that a data cut-away occurs in a process in which two data (a,b) are multiplied by means of the multiplier in FIG. 10 and transferred from the multiplier 140 to the ALU 152 or 166. The quantization error generated in this process can be formulated into the following equations:

$$Tr(a \times b) = a \times b + e_t$$
$$Tr'(a \times (-b)) = Tr(a \times (-b))$$
$$Tr'(a \times b) = a \times b - e_t \quad (1)$$

When applying the equations (1) to the IFFT algorithm having a block length of 8, an error in the IFFT output has two types of distribution. In the first distribution, when maintaining original signs of the cosine and sine constants or inverting two types of constant sign, the average value of the quantization error in the IFFT output can be given as the following expression:

$$\{(0,6me),(0,2me),(0,2me),(0,-2me),(0,3me),(0,-2me),(0,-2me),(0,-2me),(0,-6me)\} \quad (2)$$

In the second distribution, when a sign in any one of two types of constant is inverted, the average value of the quantization error in the IFFT output can be given as the following expression:

$$\{(6me,0),(2me,0),(2me,0),(-2me,0),(2me,0),(-2me,0),(-2me,0),(-2me,0),(-6me,0)\} \quad (3)$$

All the quantization error in the formula (2) is positioned at the imaginary number part; while all the quantization error in the formula (3) is positioned at the real number part. The above-mentioned distribution of the quantization error becomes different by the post-IFFT process. Prior to explaining this, the post-IFFT process will be briefly described. In the post-IFFT process, complex number samples in which the complex number IFFT step is performed is re-distributed in accordance with the corresponding block length. In other words, when the block length is 128, the post-IFFT can be formulated into the following equation:

$$\text{for}(n=0;n<128;n++)$$
$$\{y[n]=(Re(z[n])*xcos1[n]-Im(z[n])*xsin1[n])+j(Im(z[n])*xcos1[n]+Re(z[n])*xcos1[n])\} \quad (4)$$

In the equation (4), xcos1[n] is $-\cos(2\pi \cdot (8n+1)/(32 \cdot 128))$ and xsin1[n] is $\sin(2\pi \cdot (8n+1)/(32 \cdot 128))$. As seen from the equation (4), because the quantization error in the complex number IFFT output is distributed in the imaginary number part in the first case, the quantization error having a different sign is distributed in the real number part and the imaginary part at the post-IFFT output. On the other hand, because the quantization error in the complex number IFFT output is distributed at the real number part in the second case, the quantization error having the same sign is distributed in the real number part and the imaginary part at the post-IFFT output. The quantization error in the first case is canceled by a window operation followed by the post-IFFT; while the quantization error in the second case exists even when the window operation followed by the post-IFFT is performed. Therefore, since the cosine and sine constants for the IFFT are stored in the memory(i.e., the programmable memory or the working memory) as the same sign, quantization errors due to the data cut-away in the DSP according to an embodiment of the present invention are canceled each other.

As described above, the DSP according to the present invention controls the number of data bits (i.e., the wordlength) supplied to the ALU with the aid of the wiring and allows the number of rounding bits (i.e., r) to be smaller than N, so that it can shorten the length of the ALU and the accumulating register. If the number of the rounding bits is "0", it can further shorten the length of the ALU and the accumulating register. Also, in the DSP according to the present invention, the rounding of data is simultaneously performed at the time of the saturation process of data to thereby eliminate a clock required for the rounding process of data. Accordingly, the DSP according to the present invention can perform a signal process requiring the rounding, at a high speed.

Further, in the DSP according to the present invention, the bit alignment units implemented with the wiring are arranged at the pre-stage or the post-stage of the accumulator, thereby performing the fixed-point and integer arithmetics in a high speed as well as simplifying the circuit configuration.

Furthermore, the DSP according to the present invention is capable of minimizing the propagation delay time as well as reducing the number of clocks required for the operation by connecting the barrel shifter to the ALU in parallel. Accordingly, the DSP according to the present invention can perform the operation, the scaling and the operation including the scaling at a high speed.

Furthermore, the DSP according to the present invention makes a parallel operation of two complex arithmetical equations using a pair of ALUs connected in parallel, thereby operating a number of complex arithmetical equations at a high speed.

Although the present invention has been explained by the embodiments shown in the drawings described above, it should be understood to the ordinary skilled person in the art that the invention is not limited to the embodiments, but rather than that various changes or modifications thereof are possible without departing from the spirit of the invention. Accordingly, the scope of the invention shall be determined only by the appended claims and their equivalents.

What is claimed is:

1. A digital signal processor, comprising:
   data input means for receiving a N-bit data;
   rounding bit adding means for adding r-bit rounding bits to the N-bit data from the data input means, wherein r is smaller than N;
   guard bit adding means for adding g-bit guard bits to the high-order bits of the data from the rounding bit adding means;
   means for performing a prescribed operation based on the data from the guard bit adding means; and
   rounding/saturation means for making a rounding process, a saturation process and a combined process including the rounding and saturation processes, for the data from the prescribed operation means.

2. The digital signal process as claimed in claim 1, wherein said rounding/saturation means includes:
   rounding processor for rounding the data from prescribed operation means; and
   saturating processor for saturating the data from the rounding processor in accordance with logical values of the high-order (g+1) bits of the data.

3. The digital signal processor as claimed in claim 2, wherein said saturating processor saturates the data from the rounding processor at the combined process.

4. The digital signal processor as claimed in claim 3, wherein said rounding processor performs steps of:
   checking a logical value of low-order r-th bit in the bit data from the prescribed operation means;
   eliminating the low-order r-bits from the bit data; and
   adding a logical value of "1" to the data after the low-order r-bits are eliminated.

5. The digital signal processor as claimed in claim 3, wherein said saturating processor selectively generates an N-bit data, in which the most significant bit only has a logical value of '0', and an N-bit data, in which the most significant bit only has a logical value of '1', when the logical value of the high-order (g+1) bits of the data from any one of the prescribed operation means and rounding processor are different.

6. The digital signal processor as claimed in claim 3, wherein said saturating means generates an N-bit data, in which the most significant bit only has a logical value of '0', when a logical value of the most significant bit of the data from any one of the prescribed operation means and rounding is '0', and generates an N-bit data, in which the most significant bit only has a logical value of '1', when a logical value of the most significant bit of the data from any one of the prescribed operation means and rounding processor is '1'.

7. The digital signal processor as claimed in claim 3, wherein said rounding bit adding means is implemented with a wiring.

8. The digital signal processor as claimed in claim 3, wherein said guard bit adding means is implemented with a wiring.

9. A digital signal processor, comprising:
   data input means for receiving a N-bit data;
   rounding bit adding means for adding r-bit rounding bits to the N-bit data from the data input means, wherein r is smaller than N;
   guard bit adding means for adding g-bit guard bits to the high-order bits of the data from the rounding bit adding means;
   operational logic means for performing a prescribed operation based on the data from the guard bit adding means and the data from a feedback loop;
   a memory connected to the feedback loop for temporarily storing the data from the operational logic means;
   means for scaling the data from the guard bit adding means;
   selecting means for selectively transferring the data from the scaling means and the data from the guard bit adding means to the memory; and
   rounding/saturation means for making a rounding process, a saturation process and a combined process including the rounding and saturation processes, for the data memory.

10. A digital signal processor, comprising:
    data input means for receiving a N-bit data;
    rounding bit adding means for adding r-bit rounding bits to the N-bit data from the data input means, wherein r is smaller than N;
    guard bit adding means for adding g-bit guard bits to the high-order bits of the data from the rounding bit means;
    means for storing a multiplied value of two N-bit data;
    wiring aligning/guard bit adding means for deriving a (g+N+r)-bit data from the multiplied value from the storing means;
    means for performing a prescribed operation based on two accumulated values of data from the wiring aligning/guard bit adding means;
    rounding/saturation means for making a rounding process, a saturation process and a combined process including the rounding and saturation processes, for the data from a memory.

11. A digital signal processor, comprising:
    data input means for receiving an N-bit data;
    an alignment unit for aligning the N-bit data from the data input means to the left of a (N+r)-bit bus;
    means for performing a prescribed operation based on the data from the alignment unit through the (N+r)-bit bus; and
    deriving means for deriving only the high-order N bits from the data from the prescribed operation means.

12. The digital signal processor as claimed in claim 11, wherein said alignment unit is implemented with a wiring.

13. The digital signal processor as claimed in claim 11, wherein said deriving means is implemented with a wiring.

14. A digital signal processor, comprising:

data input means for receiving an N-bit data;

an alignment unit for aligning the N-bit data from the data input means to the left of a (N+r)-bit bus;

means for performing a prescribed operation based on the data from the alignment unit through the (N+r)-bit bus; and deriving means for deriving only the low-order N bits from the data from the prescribed operation means.

15. A digital signal processor, comprising:

data input means for receiving an N-bit data;

a first alignment unit for aligning the N-bit data from the data input means to the left of first (N+r)-bit bus;

a second alignment unit for aligning the N-bit data from the data input means to the right of second (N+r)-bit bus;

first selecting means for selecting the data from any one of the first and second alignment units;

means for performing a prescribed operation based on the data from the first selecting means;

first deriving means for deriving only the high-order N bits from the data from the prescribed operation means;

second deriving means for deriving only the low-order N bits from the data from the prescribed operation means; and second selecting means for selecting the data from any one of the first and second driving means.

16. A digital signal processor, comprising:

data input means for receiving an N-bit data;

an alignment unit for aligning the N-bit data from the data input means from the data input means to the left of a (N+r)-bit bus;

guard bit adding means for adding g-bit guard bits to the high-order bits of the data from the alignment unit;

means for performing a prescribed operation based on the data from the guard bit adding means;

deriving means for deriving low-order N bits beginning at the high-order (g+1) numbered bit from the data from the prescribed operation means;

rounding/saturation means for making a rounding process, a saturation process and a combined process including the rounding and saturation processes for the data from the prescribed operation means; and selecting means for selecting the data from any one of the deriving means and the rounding/saturating means.

17. A digital signal processor, comprising:

data input means for receiving an N-bit data;

an alignment unit for aligning the N-bit data from the data input means from the data input means to the left of a (N+r)-bit bus;

guard bit adding means for adding g-bit guard bits to the high-order bits of the data from the alignment unit;

means for performing a prescribed operation based on the data from the guard bit adding means;

deriving means for deriving low-order N bits among the data from the prescribed operation means;

rounding/saturation means for making a rounding process, a saturation process and a combined process including the rounding and saturation processes for the data from the prescribed operation means; and selecting means for selecting the data from any one of the deriving means and the rounding/saturating means.

18. A digital signal processor, comprising:

data input means for receiving an N-bit data;

a first alignment unit for aligning the N-bit data from the data input means to the left of first (N+r)-bit bus;

a second alignment unit for aligning the N-bit data from the data input means to the right of second (N+r)-bit bus;

first selecting means for selecting the data from any one of the first and second (N+r)-bit buses;

guard bit adding means for adding g-bit guard bits to the high-order bits of the data from the first selecting means;

means for performing a prescribed operation based on the data from the guard bit adding means;

first deriving means for deriving the high-order N bits from the data from the prescribed operation means;

second deriving means for deriving the low-order N bits beginning at the high-order (g+1) numbered bit from the data from the prescribed operation means;

rounding/saturation means for making a rounding process, a saturation process and a combined process including the rounding and saturation processes for the data from the prescribed operation means; and second selecting means for selecting the data from any one of the first and second deriving means and the rounding/saturating means.

19. A digital signal processor, comprising:

data input means for receiving an N-bit data;

an alignment unit for aligning the N-bit data from the data input means from the data input means to the left of a (N+r)-bit bus;

guard bit adding means for adding g-bit guard bits to the high-order bits of the data from the alignment unit through the (N+r)-bit bus;

means for performing a prescribed operation based on the data from the guard bit adding means and a data from a feedback loop;

a memory connected to the feedback loop for temporarily storing the data from the prescribed operation means;

means for scaling the data from the guard bit adding means;

first selecting means for selectively transferring the data from the scaling means and the data from the operating means to the memory;

means for deriving the low-order N bits beginning at the high-order (g+1) numbered bit from the data from the prescribed operation means;

rounding/saturation means for making a rounding process, a saturation process and a combined process including the rounding and saturation processes for the data from the memory; and second selecting means for selecting the data from any one of the deriving means and the rounding/saturating means.

20. A digital signal processor, comprising:

data input means for receiving an N-bit data;

an alignment unit for aligning the N-bit data from the data input means from the data input means to the right of a (N+r)-bit bus;

guard bit adding means for adding g-bit guard bits to the high-order bits of the data from the (N+r)-bit bus;

means for performing a prescribed operation based on the data from the guard bit adding means and a data from a feedback loop;

a memory connected to the feedback loop for temporarily storing the data from the prescribed operation means;

means for scaling the data from the guard bit adding means;

first selecting means for selectively transferring the data from the scaling means and the data from the prescribed operation means to the memory;

means for deriving the low-order N bits from the data from the memory;

rounding/saturation means for making a rounding process, a saturation process and a combined process including the rounding and saturation processes for the data from the memory; and second selecting means for selecting the data from any one of the deriving means and the rounding/saturating means.

21. A digital signal processor, comprising:

data input means for receiving an N-bit data;

a first alignment unit for aligning the N-bit data from the data input means from the data input means to the left of first (N+r)-bit bus;

a second alignment unit for aligning the N-bit data from the data input means to the right of second (N+r)-bit bus;

first selecting means for selecting the data from any one of the first and second (N+r)-bit buses;

guard bit adding means for adding g-bit guard bits to the high-order bits of the data from the first selecting means;

means for performing a prescribed operation based on the data from the guard bit adding means and a data from a feedback loop;

a memory connected to the feedback loop for temporarily storing the data from the prescribed operation means;

means for scaling the data from the guard bit adding means;

second selecting means for selectively transferring the data from the scaling means and the data from the prescribed operation means to the memory;

first deriving means for deriving the low-order N bits from the data from the memory;

second deriving means for deriving the high-order N bits beginning at the high-order (g+1) numbered bit from the data from the memory;

rounding/saturation means for making a rounding process, a saturation process and a combined process including the rounding and saturation processes for the data from the memory; and third selecting means for selecting the data from any one of the first and second deriving means and the rounding/saturating means.

22. A digital signal processor, comprising:

input means for receiving an N-bit data;

an alignment unit for aligning the N-bit data from the input means to the left of a (N+r)-bit bus;

means for performing a prescribed operation based on the data from the (N+r)-bit bus and a data from a feedback loop;

a memory connected to the feedback loop for temporarily storing the data from the prescribed operation means;

means for scaling the data from the alignment unit;

selecting means for selectively transferring the data from the scaling means and the data from the prescribed operation means to the memory;

means for deriving only the high-order N bits from the data from the memory.

23. A digital signal processor, comprising:

input means for receiving an N-bit data;

an alignment unit for aligning the N-bit data from the input means to the right of a (N+r)-bit bus;

means for performing a prescribed operation based on the data from the (N+r)-bit bus and a data from a feedback loop;

a memory connected to the feedback loop for temporarily storing the data from the prescribed operation means;

means for scaling the data from the (N+r)-bit bus;

selecting means for selectively transferring the data from the scaling means and the data from the prescribed operation means to the memory;

means for deriving only the low-order N bits from the data from the memory.

24. A digital signal processor, comprising:

input means for receiving an N-bit data;

a first alignment unit for aligning the N-bit data from the input means to the left of first (N+r)-bit bus;

a second alignment unit for aligning the N-bit data from the input means to the right of second (N+r)-bit bus;

first selecting means for selecting the data from any one of the first and second (N+r)-bit buses;

means for performing a prescribed operation based on the data from the first selecting means and a data from a feedback loop;

a memory connected to the feedback loop for temporarily storing the data from the prescribed operation means;

means for scaling the data from the first selecting means;

second selecting means for selectively transferring the data from the scaling means and the data from the prescribed operation means to the memory;

first deriving means for deriving only the high-order N bits from the data from the memory;

second deriving means for deriving only the low-order N bits from the data from the memory; and third selecting means for selecting the data from any one of the first and second deriving means.

* * * * *